(12) United States Patent
Miyairi et al.

(10) Patent No.: US 7,763,222 B2
(45) Date of Patent: Jul. 27, 2010

(54) EXHAUST GAS PURIFYING SYSTEM

(75) Inventors: Yukio Miyairi, Nagoya (JP); Akira Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 507 days.

(21) Appl. No.: 11/725,442

(22) Filed: Mar. 20, 2007

(65) Prior Publication Data

US 2007/0224093 A1    Sep. 27, 2007

(30) Foreign Application Priority Data

Mar. 24, 2006 (JP) ............................. 2006-084228
Feb. 15, 2007 (JP) ............................. 2007-035417

(51) Int. Cl.
*B01D 53/56* (2006.01)
*B01D 53/86* (2006.01)
*F01N 3/10* (2006.01)

(52) U.S. Cl. .................... 423/239.1; 422/177; 422/180; 60/282; 60/299

(58) Field of Classification Search ................. 422/177, 422/180; 423/239.1; 60/282, 290
See application file for complete search history.

(56) References Cited

U.S. PATENT DOCUMENTS

| 4,329,162 A * | 5/1982 | Pitcher, Jr. .................... 55/523 |
| 2005/0031514 A1* | 2/2005 | Patchett et al. ............ 423/239.2 |
| 2005/0129601 A1* | 6/2005 | Li et al. .................... 423/239.2 |

FOREIGN PATENT DOCUMENTS

| JP | A 2002-336656 | 11/2002 |
| JP | A 2003-33664 | 2/2003 |
| WO | WO 2004/022935 A1 | 3/2004 |
| WO | WO 2004/061278 A1 | 7/2004 |

OTHER PUBLICATIONS

Guy R. Chandler et al., "An Integrated SCR and Continuously Regenerating Trap System to Meet Future Nox and PM Legislation," Sae Technical Paper Series, Mar. 6, 2000, pp. 1-6, vol. 2000-01-0188, XP009109506, Society of Automotive Engineers, Warrendale, PA, US.
Alan Bunting, "Spring the Trap," Automotive Engineer, May 1, 2000, pp. 73-74, vol. 25, XP000936087, Professional Engineering Publishing, London, GB.

* cited by examiner

*Primary Examiner*—Timothy C Vanoy
*Assistant Examiner*—Diana J Liao
(74) *Attorney, Agent, or Firm*—Oliff & Berridge, PLC

(57) ABSTRACT

An exhaust gas purifying system has a honeycomb filter including a porous partition wall having a number of pores arranged so that a plurality of cells communicating between two end faces are formed, and a plugging portion disposed in either of the end faces or inside the cell so as to plug the cell; and a NOx purifying catalyst including a honeycomb catalyst carrier having substantially same shape as the honeycomb filter, and a NOx selective reducing SCR catalyst or a NOx occluding catalyst carried on surface of the partition wall and/or on surface of the pores, wherein the honeycomb filter and the NOx purifying catalytic member are disposed in this order in an exhaust gas flow path where exhaust gas discharged from a diesel engine circulates.

To provide an exhaust gas purifying system which realizes excellent purifying efficiency of NOx contained in exhaust gas discharged from a diesel engine, and small pressure loss, and can be mounted in limited space.

8 Claims, 5 Drawing Sheets

EXHAUST GAS PURIFYING SYSTEM

TECHNICAL FIELD

The present invention relates to an exhaust gas purifying system suited for use in purification of components to be purified such as nitrogen oxides (NOx) and microparticles (PM) contained in exhaust gas discharged from a diesel engine for automobile.

BACKGROUND ART

For cleaning NOx contained in exhaust gas discharged from diesel engines of automobiles and the like, catalytic members having honeycomb structure (honeycomb catalytic members) are currently used. These honeycomb catalytic members have such a structure that a catalytic layer 15 is carried on surface of a partition wall 4 forming a cell 3 as shown in FIG. 8. As shown in FIG. 9, in cleaning exhaust gas using this honeycomb catalytic member 60 (honeycomb structure member 11), exhaust gas is caused to flow into the cell 3 of the honeycomb catalytic member 60 from the side of one end face 2a, and to come into contact with a catalytic layer (not shown) on surface of the partition wall 4, and then to flow outside from the side of the other end face 2b (see, Patent document 1, for example).

When exhaust gas is purified using such a honeycomb catalytic member, it is necessary to promote transferring of components to be purified contained in the exhaust gas toward the catalytic layer on the partition wall surface from the exhaust gas as much as possible, and to improve the purifying efficiency. In order to improve the purifying efficiency of exhaust gas, it is necessary to decrease the hydraulic diameter of cell, and to increase the surface area of the partition wall. Concretely, an approach of increasing cell number per unit area (cell density) or the like is employed.

Here, it is known that transmissibility of components to be purified from exhaust gas to a catalytic layer on surface of partition wall increases in inverse proportion to square of hydraulic diameter of cell. Therefore, the higher the cell density, the better the transmissibility of components to be purified is. However, pressure loss also tends to increase in inverse proportion to square of hydraulic diameter of cell. Therefore, improvement in transmissibility of components to be purified is accompanied with the problem of increased pressure loss.

Thickness of a catalytic layer on surface or partition wall is typically about several tens micrometers. When the components to be purified diffuse in the catalytic layer at insufficient speed, the purifying efficiency of the honeycomb catalytic member tends to decrease. This tendency is particularly significant in a low-temperature condition. Therefore, in order to increase the purifying efficiency of exhaust gas, it is necessary to increase the diffusing speed of the components to be purified in the catalytic layer not only by increasing surface area of catalytic layer, but also by reducing the thickness of the catalytic layer. Increasing the cell density still poses the problem of increase in pressure loss although it advantageously increases surface area of catalytic layer.

In order to reduce pressure loss while increasing purifying efficiency of exhaust gas, it is necessary to increase the flow-in diameter of honeycomb catalytic member, and to decrease flow rate of circulating exhaust gas. However, when a honeycomb catalytic member is enlarged in size, it may become difficult to be mounted, for example, as an in-car honeycomb catalytic member because of limitation of mounting space.
[Patent document 1] Japanese patent application laid-open JP-A 2003-33664

SUMMARY OF THE INVENTION

The present invention has been devised in consideration of the problems of conventional art as described above, and it is an object of the present invention to provide an exhaust gas purifying system which achieves excellent purifying efficiency of NOx contained in exhaust gas discharged from a diesel engine, and low pressure loss, and may be mounted in limited space.

Inventors of the present invention made diligent efforts for achieving the above object, and found that the above object can be achieved by arranging in an exhaust gas flow path, a honeycomb filter, and a NOx purifying catalytic member having substantially the same shape as the honeycomb filter and carrying NOx purifying catalyst at a certain position, in this order, and finally accomplished the present invention.

That is, according to the present invention, the following exhaust gas purifying systems are provided.

[1] An exhaust gas purifying system comprising:
  a honeycomb filter including a porous partition wall having a number of pores arranged so that a plurality of cells communicating between two end faces are formed, and a plugging portion disposed in either of the end faces or inside the cell so as to plug the cell; and
  a NOx purifying catalytic member including a honeycomb catalyst carrier having substantially same shape as the honeycomb filter, and a NOx purifying catalyst carried on surface of the partition wall or on surface of the pores, wherein the honeycomb filter and the NOx purifying catalytic member are disposed in this order in an exhaust gas flow path where exhaust gas discharged from a diesel engine circulates.

[2] The exhaust gas purifying system according to the above [1], wherein the NOx purifying catalyst is a NOx selective reducing SCR containing at least one selected from the group consisting of vanadium, titania, tungsten oxide, silver and alumina, or a NOx occluding catalyst containing alkaline metal and/or alkaline earth metal.

[3] The exhaust gas purifying system according to the above [1] or [2], wherein length of the exhaust gas flow path between the end face located downstream the honeycomb filter and the end face located upstream the NOx purifying catalytic member is 1 m or less.

[4] The exhaust gas purifying system according to any one of the above [1] to [3], wherein at least part of the honeycomb filter carries oxidation catalyst containing platinum and/or palladium and ceria.

[5] The exhaust gas purifying system according to any one of the above [1] to [4], wherein at least part of the NOx purifying catalytic member carries oxidation catalyst containing platinum and/palladium and ceria.

[6] The exhaust gas purifying system according to any one of the above [1] to [5], wherein between the honeycomb filter and the NOx purifying catalytic member, an oxidation catalytic member carrying oxidation catalyst containing platinum and/palladium and ceria is disposed.

[7] The exhaust gas purifying system according to any one of the above [1] to [6], wherein cell density of the honeycomb catalyst carrier is 12.4 to 93.0 cells/cm$^2$, and thickness of the partition wall is 0.1 to 0.508 mm, and in the condition that NOx purifying catalyst is carried, the partition wall of the NOx purifying catalytic member has mean pore size of 20 to 65 µm, porosity of 40 to 70%, and common logarithm standard deviation of pore size distribution of 0.1 to 0.6.

[8] The exhaust gas purifying system according to any one of the above [2] to [7], wherein when the NOx purifying catalyst is the NOx selective reducing SCR catalyst, a first supply part capable of jetting and supplying an urea aqueous solution or ammonia aqueous solution is further provided upstream the NOx purifying catalytic member in the exhaust gas flow path.

[9] The exhaust gas purifying system according to any one of the above [2] to [8], wherein when the NOx purifying catalyst is the NOx selective reducing SCR catalyst, a second supply part capable of jetting and supplying an urea aqueous solution or ammonia aqueous solution is further provided upstream the honeycomb filter in the exhaust gas flow path.

[10] The exhaust gas purifying system according to any one of the above [1] to [9], wherein the honeycomb filter and/or the honeycomb catalyst carrier is formed of at least one ceramics selected from the group consisting of silicon carbide, cordierite, alumina titanate, Sialon, mullite, silicon nitride, zirconium phosphate, zirconia, titania, alumina and silica.

[11] The exhaust gas purifying system according to any one of the above [4] to [10], wherein when the honeycomb filter carries the oxidation catalyst, the partition wall of the honeycomb filter in the condition that the oxidation catalyst is carried has a mean pore size which is 10% or more and less than 70% of mean pore size of the partition wall of the NOx purifying catalytic member in the condition that the NOx purifying catalyst is carried.

[12] The exhaust gas purifying system according to any one of the above [1] to [11], wherein the honeycomb catalyst carrier is formed with a plurality of penetrating cells which communicate between the two end faces and lack the plugging portion by provision of the partition wall, and proportion of number of penetrating cells, relative to the sum of plugged cells in which the plugging portion is placed and the penetrating cells is 10% or more.

The exhaust gas purifying system of the present invention presents advantages of excellent purifying efficiency of NOx contained in exhaust gas discharged from diesel engines and small pressure loss, and mountability in limited space.

Figure 1:
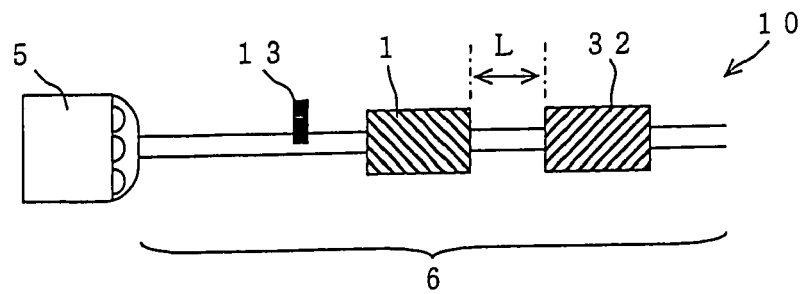
FIG. 1 is a section view schematically showing one embodiment of an exhaust gas purifying system of the present invention.

EXPLANATION OF REFERENCE NUMERALS 1, 31:honeycomb filter; 2a, 2b: end face, 3, 13, 23: cell; 4, 14, 24, 26: partition wall; 5: diesel engine; 6: exhaust gas flowpath; 10,15,20,25,30,35: exhaust gas purifying system; 11: honeycomb structure member; 12, 32: NOx purifying catalytic member; 13: urea supply part; 17, 27: plugging portion; 16, 18, 19: oxidation catalytic member; 21: NOx purifying catalyst; 33a: plugged cell; 33b, 33c: penetrating cell; 40: thick partition wall; 45: thin partition wall; 55: honeycomb catalyst carrier; 60: honeycomb catalytic member; L: distance between end faces

DESCRIPTION OF THE PREFERRED EMBODIMENTS

In the following, explanation will be made on best mode for carrying out the present invention, however, it is to be noted that the present invention is not limited to the following embodiments, and the following embodiments to which appropriate change or modification is made according to ordinary knowledge of persons skilled in the art are also embraced in the scope of the present invention without departing from the spirit of the present invention.

FIG. 1 is a section view schematically showing one embodiment of the exhaust gas purifying system of the present invention. As shown in FIG. 1, an exhaust gas purifying system 10 of the present invention has a honeycomb filter 1, and a NOx purifying catalytic member 32.

As the honeycomb filter 1 shown in FIG. 1, for example, a conventionally known diesel particulate filter (DPF) may be used. DPF generally includes a porous partition wall having a number of pores, which is arranged so that a plurality of cells communicating between two end faces are formed, and a plugging portion disposed either end face or inside a cell for plugging the cell.

The honeycomb filter constituting the exhaust gas purifying system according to the present embodiment is not particularly limited in terms of its size, porosity and pore size of partition wall, and arrangement pattern of plugging portion, and may be implemented by a honeycomb filter whish is applicable as commonly used DPF. Therefore, cell density of a honeycomb filter is typically, 7.8 to 62 cells/cm² (50 to 400 cpsi), and preferably 5.5 to 47 cells/cm² (100 to 300 cpsi). The notation "cpsi" is abbreviation for "cells per square inch", and is a unit representing number of cells per square inch. 10 cpsi corresponds to about 1.55 cells/cm².

Thickness of partition wall of the honeycomb filter is typically 0.254 to 0.508 mm (10 to 20 mil), and preferably 0.305 to 0.432 mm (12 to 17 mil). 1 mil corresponds to thousandth of 1 inch, and is about 0.025 mm.

Mean pore size of partition wall of the honeycomb filter is typically 10 to 80 μm, and preferably 25 to 68 μm. "Mean Pore size" used herein is a property value determined by a mercury porosimeter.

Porosity of partition wall of honeycomb filter is typically 30 to 70%, and preferably 45 to 65%. "Porosity" used herein is a property value determined by image analysis. Concretely, at least 5 fields from row×column=t×t ("t" represents thickness of partition wall) are observed in a SEM micrograph of cross section of partition wall. Then in each of the observed fields, gap-to-area ratio is determined, which is raised to the 3/2-rd power, and the resultant values are averaged for all fields to determine "porosity".

The NOx purifying catalytic member 32 shown in FIG. 1 includes a honeycomb catalyst carrier having substantially same shape as the above honeycomb filter 1, and a NOx purifying catalyst carried on surface of partition wall of the honeycomb catalyst carrier and/or surface of pores. "Substantially the same shape as honeycomb filter" used herein means that a porous partition wall having a number of pores, which is arranged so that a plurality of cells communicating between two end faces are formed, and a plugging portion disposed either end face or inside a cell for plugging the cell are provided. Therefore, sizes of the entirety and individual structures, porosity and pore size of partition wall, arrangement pattern of plugging portion and the like may not be necessary identical.

Figure 7:
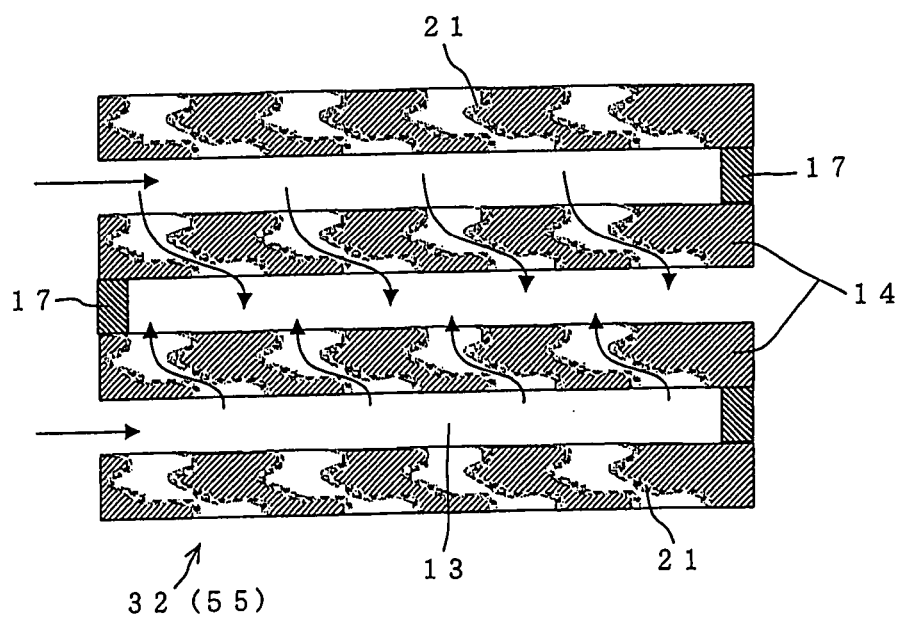
FIG. 7 is a section view schematically showing a further embodiment of an exhaust gas purifying system of the present invention.
Figure 8:
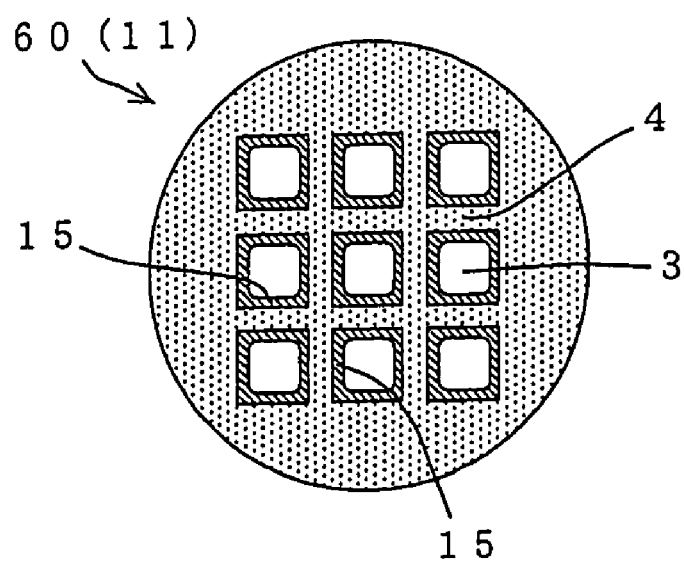
FIG. 8 is a front view schematically showing one embodiment of a conventional honeycomb structure member and honeycomb catalytic member.

FIG. 7 is a section view schematically showing one example of a NOx purifying catalytic member. The NOx purifying catalytic member 32 employed in the exhaust gas purifying system of the present embodiment has a honeycomb catalyst carrier 55 and a NOx purifying catalyst 21.

The honeycomb catalyst carrier 55 includes a porous partition wall 14 having a number of pores, which is arranged so that a plurality of cells 13 communicating between two end faces are formed, and a plugging portion 17 disposed either end face or inside a cell for plugging the cell 13. The plugging portion 17 may not be necessarily disposed on end face of the cell 13, and may be disposed inside the cell 13.

Density of cells 13 (cell density) of the honeycomb catalyst carrier 55 is preferably 12.4 to 93.0 cells/cm² (80 to 600 cpsi), more preferably 15.5 to 46.5 cells/cm² (100 to 300 cpsi), and particularly preferably 15.5 to 31.0 cells/cm² (100 to 200 cpsi). If the cell density is less than 12.4 cells/cm², contact efficiency with exhaust gas tends to be insufficient. On the other hand, if the cell density is more than 93.0 cells/cm², pressure loss tends to increase.

Thickness of partition wall 14 is preferably 0.1 to 0.508 mm (4 to 20 mil), more preferably 0.254 to 0.457 mm (10 to 18 mil), and particularly preferably 0.305 to 0.457 mm (12 to 18 mil). When thickness of the partition wall 14 is less than 0.1 mm, strength is insufficient and thermal shock resistance may decrease. On the other hand, if thickness of the wall 14 is more than 0.508, pressure loss tends to increase.

The NOx purifying catalyst 21 (see FIG. 7) is a catalyst capable of cleaning nitrogen oxides (NOx) contained in exhaust gas discharged from a diesel engine. Preferred examples of the NOx purifying catalyst 21 include NOx selective reducing SCR catalysts (hereinafter, simply referred to as "SCR catalyst") containing at least one selected from the group consisting of vanadium, titania, tungsten oxide, silver and alumina, and NOx occluding catalysts containing alkaline metal and/or alkaline earth metal. As the alkaline metal, K, Na and Li can be exemplified. As the alkaline earth metal, Ca can be exemplified. The total amount of K, Na, Li and Ca is preferably 5 g or more per one litter of volume of honeycomb catalyst carrier.

Mean pore size of partition wall of the NOx purifying catalytic member (in the condition that NOx purifying catalyst is carried) is preferably 20 to 70 μm, more preferably 30 to 70 μm, and particularly preferably 40 to 65 μm. If the mean pore size is less than 20 μm, pressure loss tends to increase. On the other hand, if the mean pore size is more than 65 μm, sufficient contact area between exhaust gas and catalyst layer tends to be difficult to be ensured.

Porosity of partition wall of the NOx purifying catalytic member (in the condition that NOx purifying catalyst is carried) is preferably 40 to 70%, and more preferably 45 to 65%. If the porosity is less than 40%, passing speed through the partition wall increases, and cleaning performance tends to be impaired. On the other hand, if the porosity is more than 70%, strength tends to be insufficient.

When common logarithm standard deviation σ of pore size distribution of partition wall of the NOx purifying catalytic member (in the condition that NOx purifying catalyst is carried) is 0.1 to 0.6, it is preferred as a carrier for constituting a catalytic member for cleaning exhaust gas discharged from a diesel engine cleaning (in-car) among the carriers constituting industrial catalytic members. Common logarithm standard deviation σ of pore size distribution is more preferably 0.2 to 0.4, and particularly preferably 0.3 to 0.4.

Figure 9:
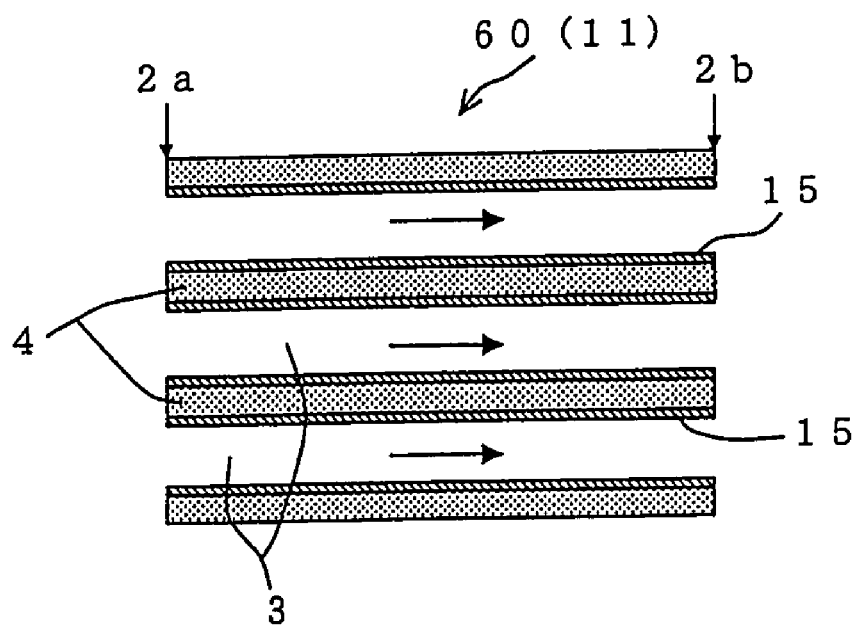
FIG. 9 is a partial enlarged view schematically showing one example of a conventional honeycomb structure.

Exhaust gas having flown into a cell 13 from one end face of the NOx purifying catalytic member 32 passes through the partition wall 14 while being in contact with the NOx purifying catalyst 21 carried on the partition wall 14 or surface of pores, and flows outside from the side of the other end face. Therefore, the NOx purifying catalytic member 32 is such a compact catalytic member that is mountable in limited space, and has better purifying efficiency than the conventional honeycomb catalytic member 60 as shown in FIG. 9. Further, in the NOx purifying catalytic member 32, pressure loss is small, and pressure loss is difficult to increase even in the case of long-time use.

As shown in FIG. 1, in the exhaust gas purifying system 10 of the present embodiment, the honeycomb filter 1 and the NOx purifying catalytic member 32 are disposed in this order in the exhaust gas flow path 6 in which exhaust gas discharged from a diesel engine 5 circulates. Exhaust gas discharged from the diesel engine 5 typically contains microparticles (particulates) such as carbon microparticles, and NOx. Exhaust gas having flown into the exhaust gas flow path 6 passes through the honeycomb filter 1. During this passage, most of the microparticles contained in the exhaust gas is captured by the partition wall of the honeycomb filter 1. The exhaust gas from which most of microparticles is removed then passes through the NOx purifying catalytic member 32. Since the NOx contained in the exhaust gas is purified in the course of this passage, purified gas from which microparticles and NOx are removed is exhausted from the NOx purifying catalytic member 32.

In the exhaust gas purifying system 10 of the present embodiment, the honeycomb filter 1 is disposed prior to the NOx purifying catalytic member 32 in the exhaust gas flow path 6. Accordingly, the exhaust gas from which microparticles are removed by the honeycomb filter 1 will pass the NOx purifying catalytic member 32. Accordingly, pores in the partition wall of the NOx purifying catalytic member 32 are unlikely to be obstructed, so that pressure loss is small, and pressure loss is unlikely to increase even with long-term use.

Length of the exhaust gas flow path 6 between the downstream end face of the honeycomb filter 1 and the upstream end face of the NOx purifying catalytic member 32 (end face-to-end face length L) is preferably 1 m or less, more preferably 0.5 m or less, and particularly preferably 0.3 m or less. When the end face-to-end face length L is 1 m or less, the exhaust gas at high temperature discharged from the diesel engine 5 flows out of the honeycomb filter 1 and flows into the NOx purifying catalytic member 32 in a certain high temperature condition, with the result that activity of the NOx purifying catalyst carried by the NOx purifying catalytic member 32 increases and thus purifying efficiency improves. Lower limit value of the end face-to-end face length L is not particularly limited, however, the length should be 0.01 m because too small length may possibly impair the activity of the NOx purifying catalyst. Temperature of the exhaust gas at entry into the NOx purifying catalytic member 32 is preferably 80 to 600° C.

Preferably at least part of the NOx purifying catalytic member 32, for example, surface of the partition wall or pores carries an oxidation catalyst containing platinum and/or palladium, and ceria for exertion of more excellent purifying efficiency. It is also preferred that the above oxidation catalyst is carried on at least part of the honeycomb filter 1, for exertion of more excellent purifying efficiency. The total amount of platinum and palladium is preferably 0.17 to 7.07 g per 1 litre of volume of carrier (honeycomb catalyst carrier, honeycomb filter).

When the NOx purifying catalyst is a SCR catalyst, the exhaust gas purifying system 10 of the present embodiment preferably has a supply part (urea supply part 13) capable of jetting and supplying an urea aqueous solution or an ammonia aqueous solution in the exhaust gas flow path 6 on the upstream of the NOx purifying catalytic member 32 (more preferably, upstream of the honeycomb filter 1). By providing such urea supply part 13 or the like, it is possible to improve the catalytic ability of the SCR catalyst and further improve the purifying efficiency. The urea supply part 13 may be disposed halfway between the honeycomb filter 1 and the NOx purifying catalytic member 32 as shown in FIG. 2, as well as upstream of the honeycomb filter 1 as shown in FIG. 1.

Figure 2:
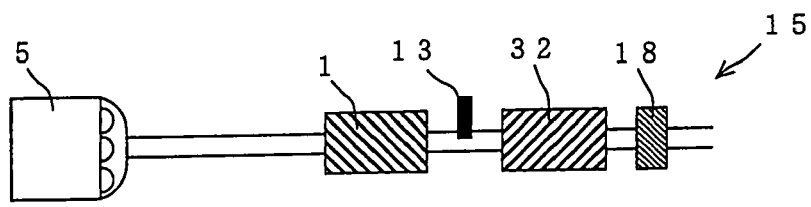
FIG. 2 is a section view schematically showing another embodiment of an exhaust gas purifying system of the present invention.

Further, as shown in FIG. 2, in the exhaust gas purifying system 15 of the present embodiment, an oxidation catalytic member 18 is preferably disposed in the exhaust gas flow path for exertion of more excellent purifying efficiency. As the oxidation catalytic member 18, for example, a honeycomb-shaped filter carrying oxidation catalyst as described above can be suitably used.

Figure 3:
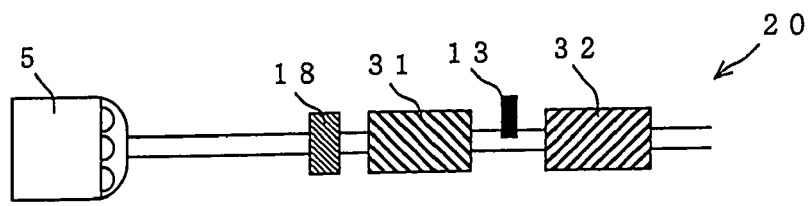
FIG. 3 is a section view schematically showing other embodiment of an exhaust gas purifying system of the present invention.
Figure 4:
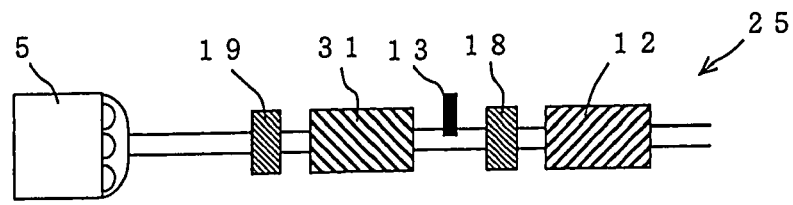
FIG. 4 is a section view schematically showing a further embodiment of an exhaust gas purifying system of the present invention.
Figure 5:
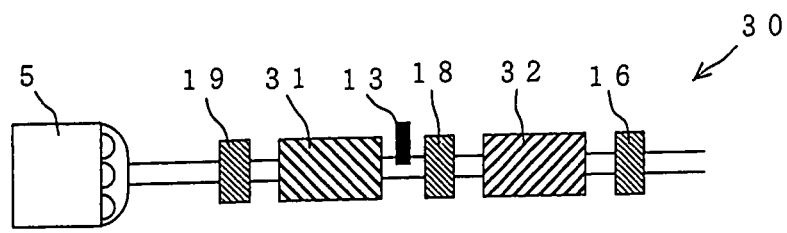
FIG. 5 is a section view schematically showing a further embodiment of an exhaust gas purifying system of the present invention.

The oxidation catalytic member 18 may be disposed at positions other than downstream of the NOx purifying catalytic member 32 as shown in FIG. 2. For example, it may be disposed upstream of a honeycomb filter 31 like an exhaust gas purifying system 20 as shown in FIG. 3, or halfway between the honeycomb filter 31 and the NOx purifying catalytic member 12 like an exhaust gas purifying system 25 as shown in FIG. 4. Likewise the exhaust gas purifying system 25 shown in FIG. 4 and the exhaust gas purifying system 30 shown in FIG. 5, a plurality of oxidation catalytic members 16, 18, 19 may be disposed to achieve more excellent purifying efficiency.

In the exhaust gas purifying system of the present embodiment, when the honeycomb filter carries oxidation catalyst (for example, honeycomb filter 31 in FIG. 3), mean pore size of partition wall of the honeycomb filter which is carrying oxidation catalyst is preferably 10% or more and less than 70%, more preferably 20 to 60%, and particularly preferably 30 to 50% of mean pore size of partition wall of the NOx purifying catalytic member which is carrying NOx purifying catalyst. When it is less than 10%, filter pressure loss tends to increase. On the other hand, when it is 70% or more, clogging of the NOx purifying catalytic member tends to increase.

Figure 10:
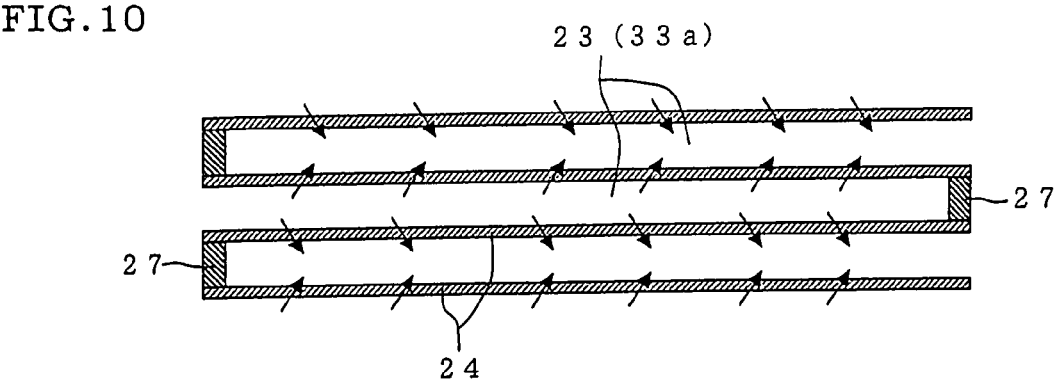
FIG. 10 is a partial section view schematically showing one example of NOx purifying catalytic member used in an exhaust gas purifying system of the present invention.

Next, configuration of NOx purifying catalytic member will be explained. FIG. 10 is a partial section view schematically showing one example of NOx purifying catalytic member used in an exhaust gas purifying system of the present invention. In the NOx purifying catalytic member shown in FIG. 10, cells 23 are formed by arranging porous partition walls 24. Also by disposing a plugging portion 27 so as to plug the cell 23 at its end face, a plugged cell 33a is formed.

Figure 11:
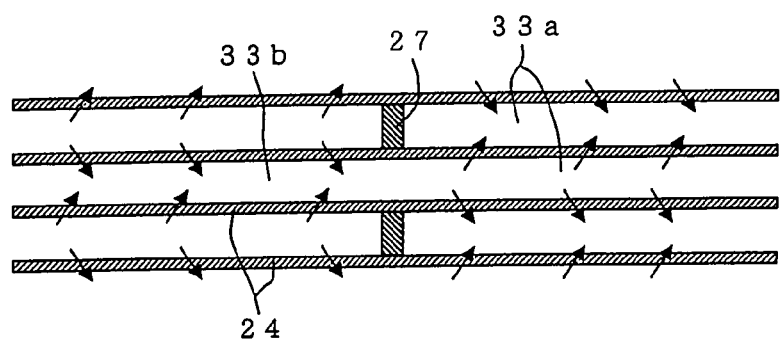
FIG. 11 is a partial section view schematically showing other example of NOx purifying catalytic member used in an exhaust gas purifying system of the present invention.

The plugged cell 33a may be formed by arranging the plugging portion 27 so as to plug inside the cell 23 as shown in FIG. 11. Here, it is preferred that a plurality of penetrating cells 33b are further formed that communicate between two end faces and are not formed with a plugging portion 27, by forming a partition wall 24, in the honeycomb catalyst carrier constituting the NOx purifying catalytic member. Forming such penetrating cells 33b is desirable because pressure loss is decreased.

When the plurality of penetrating cells 33b are further formed in the honeycomb catalyst carrier constituting the NOx purifying catalytic member, the proportion of number of penetrating cells 33b, to the total number of plugged cells 33a and the penetrating cells 33b is preferably 10% or more, more preferably 20 to 60%, and particularly preferably 40 to 50%. If the proportion of number of penetrating cells 33b, to the total number of plugged cells 33a and the penetrating cells 33b is less than 10%, pressure loss tends to increase.

Figure 12:
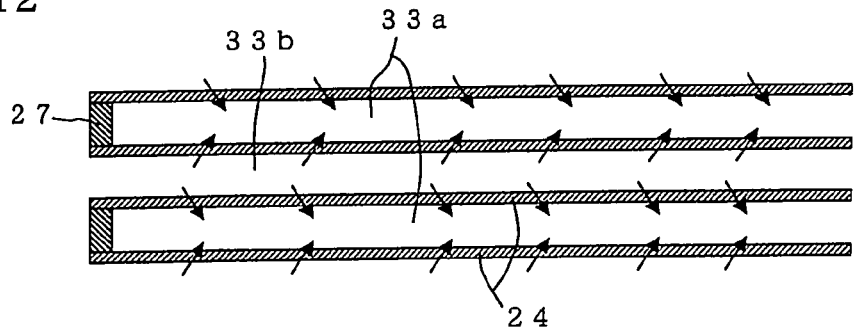
FIG. 12 is a partial section view schematically showing a further example of NOx purifying catalytic member used in an exhaust gas purifying system of the present invention.
Figure 13:
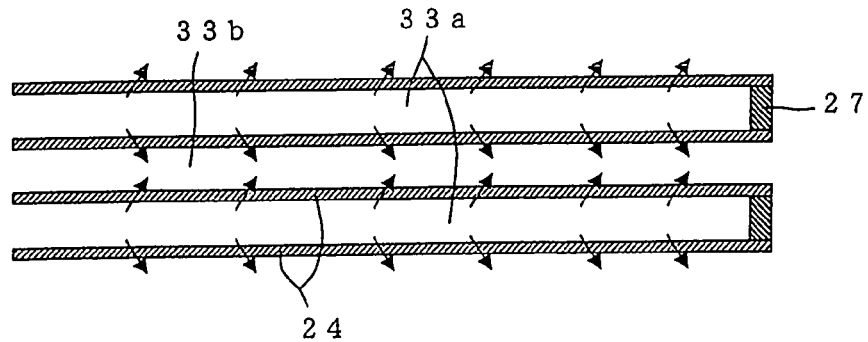
FIG. 13 is a partial section view schematically showing a further example of NOx purifying catalytic member used in an exhaust gas purifying system of the present invention.
Figure 14:
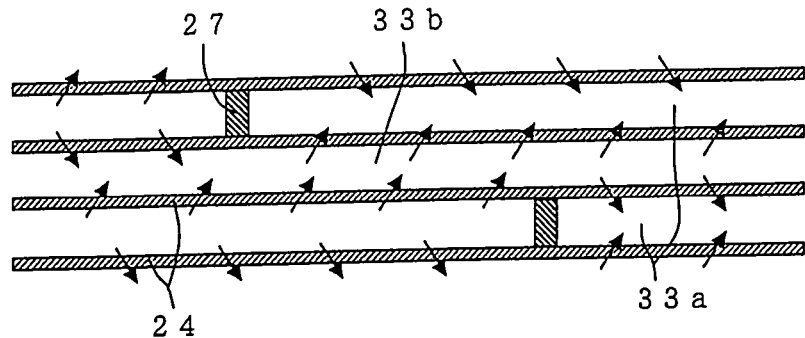
FIG. 14 is a partial section view schematically showing a further example of NOx purifying catalytic member used in an exhaust gas purifying system of the present invention.

As shown in FIG. 12, the penetrating cell 33b may be formed while the plugged cell 33a is formed by disposing a plugging portion 27 only on the side of end face of cell in which exhaust gas flows in. As shown in FIG. 13, the penetrating cell 33b may be formed while the plugged cell 33a is formed by disposing a plugging portion 27 only on the side of end face of cell in which exhaust gas flows out. Also, as shown in FIG. 14, the plugging portions 27 may be disposed inside a cell while they are displaced from each other in the passage direction of the cell.

Figure 15:
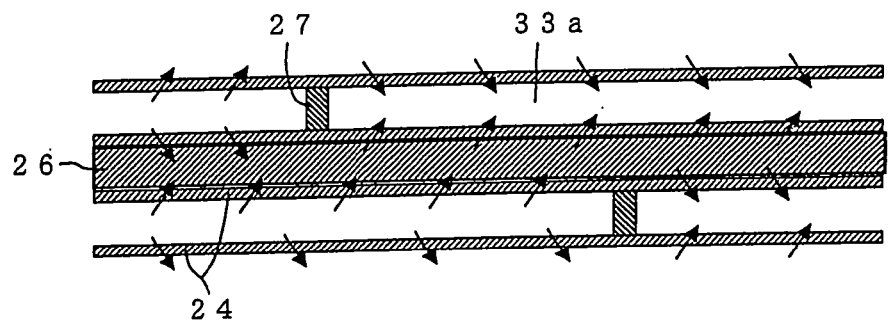
FIG. 15 is a partial section view schematically showing a further example of NOx purifying catalytic member used in an exhaust gas purifying system of the present invention.
Figure 16:
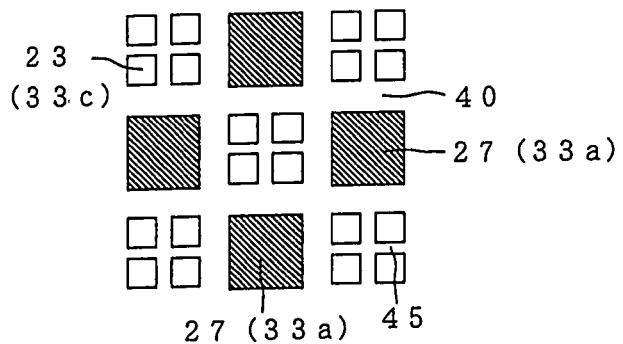
FIG. 16 is a partial section view showing the NOx purifying catalytic member of FIG. 15, cut perpendicularly to the flow path.

Also preferred is a structure as shown in FIGS. 15 and 16 in which a plugging portion 27 is disposed inside a cell to form a plugged cell 33a, and a penetrating cell 33c finely partitioned by a thin partition wall 45 is formed. The reference numeral 26 in FIG. 15 denotes a partition wall, and the reference numeral 40 in FIG. 16 denotes a thick partition wall. In this case, provision of a penetrating cell 33c which is finely partitioned enables more effective prevention of decrease in cleaning performance.

Preferred examples of materials forming the honeycomb filter and the honeycomb catalyst carrier include materials based on ceramics, sintered metal and the like. When the honeycomb structure member 1 of the present embodiment is made of a material based on ceramics, as the ceramics, silicon carbide, cordierite, alumina titanate, Sialon, mullite, silicon nitride, zirconium phosphate, zirconia, titania, alumina or silica, or combination thereof can be recited as preferred examples. In particular, silicon carbide, cordierite, mullite, silicon nitride, alumina and the like ceramics are preferred from the view point of alkaline resistance. Among these, oxide ceramics are preferred in terms of cost.

In the honeycomb filter and the honeycomb catalyst carrier, a shape of cross section cut diametrically in the surface perpendicular to communicating direction of cell is preferably the shape that is suited for the inner shape of exhaust system where it is to be mounted. Concrete shape examples include, circle, ellipse, prolate ellipsoid, trapezoid, triangle, quadrangle, hexagon, or left-right asymmetrical irregular shape. Among these, circle, ellipse and prolate ellipsoid are preferred.

The honeycomb filter and honeycomb catalyst carrier may be produced, for example, in accordance with a conventionally known production method of diesel particulate filter (DPF), by appropriately adjusting chemical composition of material, or by appropriately adjusting kind, particulate diameter, adding amount and the like of a pore forming agent which is used for forming porous structure.

The NOx purifying catalytic member may be produced by making the honeycomb catalyst carrier carry the NOx purifying catalyst in accordance with a production method which is a conventionally known method. To be more specific, first, a catalyst slurry containing NOx purifying catalyst is prepared. Then the porous surface of the partition wall of the honeycomb catalyst carrier is coated with this catalyst slurry by suction and the like method. Then it is dried at room temperature or under heating to give a NOx purifying catalytic member.

EXAMPLES

In the following, the present invention will be concretely explained based on examples of the present invention, however, it is to be noted that the present invention is not limited to these examples. "Part" and "%" used in these examples and comparative examples are based on mass without otherwise specified. Measurement methods of various properties and evaluation methods of various characteristics will be described below.

[Mean Pore size]: Mean Pore size was calculated by pore size values measured using a mercury porosimeter (Trade name: Auto Pore III, Type 9405 of Micromeritics LTD.).

[Porosity]: Porosity was determined by image analysis. Concretely, at least 5 fields from row×column=t×t ("t" represents thickness of partition wall) are observed in a SEM micrograph of cross section of partition wall. Then in each of the observed fields, gap-to-area ratio is determined, which is raised to the 3/2-rd power, and the resultant value is averaged for all fields to determine "porosity".

[NOx purifying efficiency]: Combustion gas composed of HC (propylene), CO, NO, $H_2O$, $O_2$ and $N_2$ was caused to flow into an exhaust gas purifying system at a space velocity (sv) of 100000 $h^{-1}$, and at a temperature of 200° C. From NOx concentrations of combustion gas before and after flow-in, NOx purifying efficiency (%) was calculated.

[Pressure loss]: At room temperature, air was circulated at flow rate of 0.5 $m^3$/min, and pressure loss at a NOx purifying catalytic member was measured. A relative value (pressure loss (relative value)), to pressure loss at a reference NOx purifying catalytic member was calculated.

Example 1

A honeycomb catalyst carrier made of cordierite whose end is alternately plugged was prepared. This honeycomb catalyst carrier had outer diameter: 144 mm, length: 152 mm, cell density: 46. 5 cells/$cm^2$, partition wall thickness: 0.305 mm, mean pore size of partition wall: 25 μm, and porosity: 65%. By carrying copper-substituted zeolite on porous surface and partition wall surface of the honeycomb catalyst carrier in an amount of 200 g/L per volume of the honeycomb catalyst carrier, NOx purifying catalytic member (1) was prepared (structure: see FIG. 10).

A honeycomb structure member made of cordierite whose end is alternately plugged was prepared. This honeycomb structure member had outer diameter: 144 mm, length: 152 mm, cell density: 46.5 cells/$cm^2$, partition wall thickness: 0.305 mm, mean pore size of partition wall: 15 μm, and porosity: 60%. By coating porous surface and partition wall surface of the honeycomb structure member with oxidation catalyst carrying Pt on grinded particles of gamma alumina and ceria in an amount of 100 g/L (Pt:2 g/L) per volume of honeycomb structure member, DPF (2) was prepared.

A honeycomb structure member made of cordierite having a penetrating cell was prepared. This honeycomb structure member had outer diameter: 144 mm, length: 80 mm, cell density: 46.5 cells/$cm^2$, and partition wall thickness: 0.14 mm. By coating partition wall surface of the honeycomb structure member with oxidation catalyst carrying Pt and Pd on grinded particles of gamma alumina and ceria so that Pt: 0.5 g/L and Pd: 3 g/L per volume of honeycomb structure member, DPF (3) was prepared.

A honeycomb structure member made of cordierite having a penetrating cell was prepared. This honeycomb structure member had outer diameter: 144 mm, length: 80 mm, cell density: 62 cells/$cm^2$, and partition wall thickness: 0.11 mm. By coating partition wall surface of the honeycomb structure member with oxidation catalyst carrying Pt and Pd on grinded particles of gamma alumina and ceria so that Pt: 1 g/L and Pd: 2 g/L per volume of honeycomb structure member, DPF (4) was prepared.

In an exhaust system of a diesel engine adapted to car of 2 L displacement, the prepared NOx purifying catalytic member (1), DPF(2), oxidation catalytic member (3), and oxidation catalytic member (4) were placed in the order of (3)-(2)-(4)-(1), to create an exhaust gas flow path. Between the DPF (2) and the oxidation catalytic member (4), disposed was an urea supply device for jetting and supplying the interior of the flow path with an urea aqueous solution. Further, just before the oxidation catalytic member (4), a NOx concentration sensor was provided, to produce an exhaust gas purifying system (Example 1) (layout: see FIG. 4). Results of determined NOx purifying efficiency (%), and pressure loss (relative value) are shown in Table 1.

Comparative Example 1

In an exhaust system of a diesel engine adapted to car of 2 L displacement, the prepared NOx purifying catalytic member (1) and oxidation catalytic member (4) prepared in Example 1 were placed in the order of (4)-(1), to create an exhaust gas flow path. Just before the oxidation catalytic member (4), an urea supply device for jetting and supplying the interior of the flow path with an urea aqueous solution, and a NOx concentration sensor were provided, to produce an exhaust gas purifying system (Comparative example 1). Results of determined NOx purifying efficiency (%), and pressure loss (relative value) are shown in Table 1.

Examples 2 to 17

An exhaust gas purifying system (Examples 2 to 17) was produced in a similar manner to Example 1 described above except that constructions of NOx purifying catalytic member and DPF, and layout of constituents are changed as shown in Table 1. Results of determined NOx purifying efficiency (%), and pressure loss (relative value) are shown in Table 1.

TABLE 1

Figure 6:
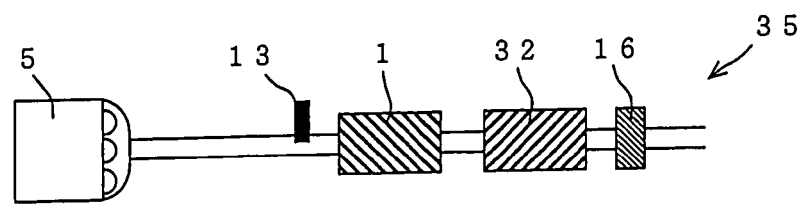
FIG. 6 is a section view schematically showing a further embodiment of an exhaust gas purifying system of the present invention.

| | NOx purifying catalytic member | | | | | Mean pore size (μm) | | DPF mean pore size/NOx purifying catalytic member mean pore size (%) | Layout | NOx purifying efficiency (%) | Pressure loss (relative value) |
|---|---|---|---|---|---|---|---|---|---|---|---|
| | Cell density (cells/cm²) | Partition wall thickness (mm) | Porosity (%) | σ*¹ (μm) | Structure | DPF | NOx purifying catalyst member | | | | |
| Example 1 | 46.5 | 0.305 | 65 | 0.4 | FIG. 10 | 15 | 25 | 60 | FIG. 4 | 85 | 100 |
| Comparative example 1 | 46.5 | 0.305 | 65 | 0.4 | FIG. 10 | — | 25 | — | *2 | 20 | 100 |
| Example 2 | 46.5 | 0.305 | 50 | 0.4 | FIG. 10 | 15 | 25 | 60 | FIG. 4 | 75 | 105 |
| Example 3 | 46.5 | 0.305 | 45 | 0.4 | FIG. 10 | 15 | 25 | 60 | FIG. 4 | 65 | 112 |
| Example 4 | 46.5 | 0.305 | 65 | 0.2 | FIG. 10 | 15 | 25 | 60 | FIG. 4 | 80 | 100 |
| Example 5 | 46.5 | 0.305 | 65 | 0.4 | FIG. 10 | 10 | 55 | 18.2 | FIG. 4 | 72 | 95 |
| Example 6 | 46.5 | 0.305 | 65 | 0.4 | FIG. 10 | 15 | 62 | 24.2 | FIG. 4 | 70 | 95 |
| Example 7 | 46.5 | 0.305 | 65 | 0.4 | FIG. 10 | 15 | 73 | 20.5 | FIG. 4 | 58 | 95 |
| Example 8 | 46.5 | 0.305 | 65 | 0.4 | FIG. 10 | 25 | 85 | 29.4 | FIG. 4 | 55 | 95 |
| Example 9 | 46.5 | 0.305 | 65 | 0.4 | FIG. 10 | 35 | 105 | 33.3 | FIG. 4 | 50 | 95 |
| Example 10 | 46.5 | 0.2 | 65 | 0.4 | FIG. 10 | 15 | 25 | 60 | FIG. 4 | 65 | 95 |
| Example 11 | 46.5 | 0.4 | 65 | 0.4 | FIG. 10 | 15 | 25 | 60 | FIG. 4 | 80 | 110 |
| Example 12 | 15 | 0.305 | 65 | 0.4 | FIG. 10 | 15 | 25 | 60 | FIG. 4 | 50 | 85 |
| Example 13 | 92 | 0.305 | 65 | 0.4 | FIG. 10 | 15 | 25 | 60 | FIG. 4 | 70 | 120 |
| Example 14 | 46.5 | 0.305 | 65 | 0.4 | FIG. 13*³ | 15 | 25 | 60 | FIG. 4 | 50 | 70 |
| Example 15 | 46.5 | 0.305 | 65 | 0.4 | FIG. 13*⁴ | 15 | 25 | 60 | FIG. 4 | 55 | 40 |
| Example 16 | 46.5 | 0.305 | 65 | 0.4 | FIG. 13*⁵ | 15 | 25 | 60 | FIG. 4 | 54 | 30 |
| Example 17 | 46.5 | 0.305 | 65 | 0.4 | FIG. 10 | 15 | 25 | 60 | FIG. 6 | 95 | 100 |

*¹common logarithm standard deviation σ of pore size distribution
*2: oxidation catalytic member + SCR catalyst
*³Proportion of number of penetrating cells = 20%
*⁴Proportion of number of penetrating cells = 50%
*⁵Proportion of number of penetrating cells = 65%

(Discussion)

As shown in Table 1, the exhaust gas purifying systems of Examples 1 to 17 apparently show excellent NOx purifying efficiency compared to the exhaust gas purifying system of Comparative example 1. As for pressure loss, the exhaust gas purifying systems of Examples 1 to 17 showed acceptable ranges.

Examples 18 to 21

A NOx purifying catalytic member which is identical to that used in Example 1 was prepared. By coating porous surface and partition wall surface of the partition wall of the NOx purifying catalytic member with oxidation catalyst carrying Pt on gamma alumina and ceria in an amount of 100 g/L (Pt: 2 g/L) per volume of honeycomb structure member, a NOx purifying catalytic member (1') with oxidation catalyst was prepared. DPF (2') which is identical to Example 1 described above except for coating with oxidation catalyst was prepared.

In an exhaust system of a diesel engine adapted to car of 2 L displacement, the prepared NOx purifying catalytic member (1'), DPF (2') and oxidation catalytic member (3) were placed in the order of (2')-(1')-(3) so that the length between an outlet end face of DPF (2') and an inlet end face of NOx purifying catalytic member (1') was 0.1 m, 0.4 m, 0.8 m, and 1.5 m, to create an exhaust gas flow path. Just before the NOx purifying catalytic member (1'), an urea supply device for jetting and supplying the interior of the flow path with an urea aqueous solution was disposed. Further, just before the oxidation catalytic member (3), a NOx concentration sensor was disposed. In this manner, exhaust gas purifying systems (Examples 18 to 21) were produced (layout: see FIG. 6). Results of determined NOx purifying efficiency (%), and pressure loss (relative value) are shown in Table 1.

TABLE 2

| | NOx purifying catalytic member | | | | | Mean pore size (μm) | | DPF mean pore size/NOx purifying catalytic member mean pore size (%) | Layout | Length between DPF outlet end face and NOx purifying catalytic member inlet end face | NOx purifying efficiency (%) | Pressure loss (relative value) |
|---|---|---|---|---|---|---|---|---|---|---|---|---|
| | Cell density (cells/cm²) | Partition wall thickness (mm) | Porosity (%) | σ*¹ (μm) | Structure | DPF | NOx purifying catalyst member | | | | | |
| Example 18 | 46.5 | 0.305 | 65 | 0.4 | FIG. 10 | 15 | 25 | 60 | FIG. 6 | 0.1 | 90 | 100 |
| Example 19 | 46.5 | 0.305 | 65 | 0.4 | FIG. 10 | 15 | 25 | 60 | FIG. 6 | 0.4 | 88 | 100 |
| Example 20 | 46.5 | 0.305 | 65 | 0.4 | FIG. 10 | 15 | 25 | 60 | FIG. 6 | 0.8 | 85 | 100 |
| Example 21 | 46.5 | 0.305 | 65 | 0.4 | FIG. 10 | 15 | 25 | 60 | FIG. 6 | 1.5 | 65 | 100 |

*¹common logarithm standard deviation σ of pore size distribution (Discussion)

As is apparent from Table 1, exhaust gas purifying systems of Examples 18 to 21 achieve low pressure loss and excellent NOx purifying efficiency. It was demonstrated that the longer the length between DPF outlet end face and NOx purifying catalytic member inlet end face, the lower the NOx purifying efficiency is.

The exhaust gas purifying system of the present invention realizes excellent purifying efficiency of NOx and low pressure loss, and can be mounted in limited space. Therefore, the exhaust gas purifying system of the present invention is suited for use in purification of NOx contained in exhaust gas discharged from, for example, stationary engines for automobile, construction machinery, and industrial applications, and from burning appliances.

What is claimed is:

1. An exhaust gas purifying system comprising:
    a first oxidation catalytic member carrying oxidation catalyst containing at least one metal selected from platinum and palladium, and ceria;
    a honeycomb filter including a porous partition wall having a number of pores arranged so that a plurality of cells communicating between two end faces are formed, and a plugging portion disposed in either of the end faces or inside the cell so as to plug the cell;
    a second oxidation catalytic member carrying oxidation catalyst containing at least one metal selected from platinum and palladium, and ceria; and
    a NOx purifying catalytic member including a honeycomb catalyst carrier having substantially same shape as the honeycomb filter, and a NOx purifying catalyst carried on surface of the partition wall or on surface of the pores,
    wherein the first oxidation catalytic member, the honeycomb filter, the second oxidation catalytic member, and the NOx purifying catalytic member are disposed in this order in an exhaust gas flow path where exhaust gas discharged from a diesel engine circulates,
    wherein when the NOx purifying catalyst is the NOx selective reducing SCR catalyst, a first supply part capable of jetting and supplying an urea aqueous solution or ammonia aqueous solution is further provided upstream the NOx purifying catalytic member in the exhaust gas flow path, and a second supply part capable of jetting and supplying an urea aqueous solution or ammonia aqueous solution is further provided upstream the honeycomb filter in the exhaust gas flow path, and
    wherein cell density of the honeycomb catalyst carrier is 12.4 to 93.0 cells/cm$^2$, and thickness of the partition wall is 0.1 to 0.508 mm, and in the condition that NOx purifying catalyst is carried, the partition wall of the NOx purifying catalytic member has mean pore size of 20 to 65 μm, porosity of 40 to 70%, and common logarithm standard deviation of pore size distribution of 0.1 to 0.6.

2. The exhaust gas purifying system according to claim 1, wherein the NOx purifying catalyst is a NOx selective reducing SCR containing at least one selected from the group consisting of vanadium, titania, tungsten oxide, silver and alumina, or a NOx occluding catalyst containing alkaline metal and/or alkaline earth metal.

3. The exhaust gas purifying system according to claim 1, wherein length of the exhaust gas flow path between the end face located downstream the honeycomb filter and the end face located upstream the NOx purifying catalytic member is 1 m or less.

4. The exhaust gas purifying system according to claim 1, wherein at least part of the honeycomb filter carries oxidation catalyst containing platinum and/or palladium and ceria.

5. The exhaust gas purifying system according to claim 1, wherein at least part of the NOx purifying catalytic member carries oxidation catalyst containing platinum and/or palladium and ceria.

6. The exhaust gas purifying system according to claim 1, wherein the honeycomb filter and/or the honeycomb catalyst carrier is formed of at least one ceramics selected from the group consisting of silicon carbide, cordierite, alumina titanate, Sialon, mullite, silicon nitride, zirconium phosphate, zirconia, titania, alumina and silica.

7. The exhaust gas purifying system according to claim 4, wherein when the honeycomb filter carries the oxidation catalyst, the partition wall of the honeycomb filter in the condition that the oxidation catalyst is carried has a mean pore size which is 10% or more and less than 70% of mean pore size of the partition wall of the NOx purifying catalytic member in the condition that that NOx purifying catalyst is carried.

8. The exhaust gas purifying system according to claim 1, wherein the honeycomb catalyst carrier is formed with a plurality of penetrating cells which communicate between the two end faces and lack the plugging portion by provision of the partition wall, and proportion of number of penetrating cells, relative to the sum of plugged cells in which the plugging portion is placed and the penetrating cells is 10% or more.

* * * * *